(12) United States Patent
Chen et al.

(10) Patent No.: US 11,921,848 B2
(45) Date of Patent: Mar. 5, 2024

(54) CHARACTERIZING SUSCEPTIBILITY OF A MACHINE-LEARNING MODEL TO FOLLOW SIGNAL DEGRADATION AND EVALUATING POSSIBLE MITIGATION STRATEGIES

(71) Applicant: Oracle International Corporation, Redwood Shores, CA (US)

(72) Inventors: Zexi Chen, Mountain View, CA (US); Kenny C. Gross, Escondido, CA (US); Ashin George, Sunnyvale, CA (US); Guang C. Wang, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 794 days.

(21) Appl. No.: 17/086,855

(22) Filed: Nov. 2, 2020

(65) Prior Publication Data

US 2022/0138316 A1  May 5, 2022

(51) Int. Cl.
*G06F 17/16* (2006.01)
*G06F 17/18* (2006.01)
*G06F 21/55* (2013.01)
*G06N 5/04* (2023.01)
*G06N 20/00* (2019.01)

(52) U.S. Cl.
CPC ............ *G06F 21/554* (2013.01); *G06F 17/16* (2013.01); *G06F 17/18* (2013.01); *G06N 5/04* (2013.01); *G06N 20/00* (2019.01)

(58) Field of Classification Search
CPC ............ G06F 17/16; G06F 17/18; G06N 5/04
USPC ......................................................... 708/403
See application file for complete search history.

(56) References Cited

U.S. PATENT DOCUMENTS

| 2020/0218801 A1* | 7/2020 | Gross .................... G06F 21/577 |
| 2020/0272140 A1* | 8/2020 | Gross ................. G05B 23/0283 |
| 2021/0065316 A1* | 3/2021 | Wetherbee ............. G06F 17/18 |

* cited by examiner

*Primary Examiner* — Tan V Mai
(74) *Attorney, Agent, or Firm* — Park, Vaughan, Fleming & Dowler LLP

(57) ABSTRACT

The disclosed embodiments relate to a system that characterizes susceptibility of an inferential model to follow signal degradation. During operation, the system receives a set of time-series signals associated with sensors in a monitored system during normal fault-free operation. Next, the system trains the inferential model using the set of time-series signals. The system then characterizes susceptibility of the inferential model to follow signal degradation. During this process, the system adds degradation to a signal in the set of time-series signals to produce a degraded signal. Next, the system uses the inferential model to perform prognostic-surveillance operations on the set of time-series signals with the degraded signal. Finally, the system characterizes susceptibility of the inferential model to follow degradation in the signal based on results of the prognostic-surveillance operations.

20 Claims, 15 Drawing Sheets
(8 of 15 Drawing Sheet(s) Filed in Color)

CHARACTERIZING SUSCEPTIBILITY OF A MACHINE-LEARNING MODEL TO FOLLOW SIGNAL DEGRADATION AND EVALUATING POSSIBLE MITIGATION STRATEGIES

BACKGROUND

Field

The disclosed embodiments generally relate to techniques for using machine-learning (ML) models to perform prognostic-surveillance operations based on time-series sensor signals. More specifically, the disclosed embodiments relate to a technique for characterizing the susceptibility of an ML model to follow signal degradation and evaluating possible mitigation strategies.

Related Art

Large numbers of sensors are presently deployed to monitor the operational health of critical assets in a large variety of business-critical systems. For example, a medium-sized computer data center can include over 1,000,000 sensors monitoring thousands of servers, a modern passenger jet can include 75,000 sensors, an oil refinery can include over 1,000,000 sensors, and even an ordinary car can have over 100 sensors. These sensors produce large volumes of time-series sensor data, which can be used to perform prognostic-surveillance operations to facilitate detecting incipient anomalies. This makes it possible to take remedial action before the incipient anomalies develop into failures in the critical assets.

Machine-learning (ML) techniques are commonly used to perform prognostic-surveillance operations on time-series sensor data, and also for validating the integrity of the sensors themselves. ML-based prognostic-surveillance techniques typically operate by training an ML model (also referred to as an "inferential model") to learn correlations among time-series signals. The trained ML model is then placed in a surveillance mode where it is used to predict values for time-series signals based on the correlations with other time-series signals, wherein deviations between actual and predicted values for the time-series signals trigger alarms that indicate an incipient anomaly. This makes it possible to perform remedial actions before the underlying cause of the incipient anomaly leads to a catastrophic failure.

However, because of the complex interplay of dependencies among time-series signals, smaller ML models with poor signal-to-noise ratios often generate predicted values that "follow" degradation in a signal. This is problematic because anomalies are normally discovered by prognostic-surveillance systems when a real signal deviates from the model's predicted values. Hence, if the model's predicted values "follow" the real measured signal, no degradation is detected, which can be dangerous in safety-critical industries, and costly in industries for which undetected anomalies lead to catastrophic failures.

The "Following phenomenon" occurs because ML models typically operate by performing training operations that generate "weights" associated with the correlations among signals. However, when an ML model is trained on random signals, the ML model is designed with the implicit understanding that it cannot predict the random signals, so the ML model will set its weights to zero. Hence, when new observations are received during the surveillance mode, the model has zero weights, and the best predicted values will be the observations themselves. This means that when an ML model is too small or noisy, the predicted values will tend to follow the observations, which causes the residuals to become small, and makes it difficult to detect signal deviations.

Note that the "Following phenomenon" has nothing to do with the quality of the monitored components or the accuracy of the sensors. Hence, if an asset owner replaces components and/or sensors because of missed alarms, and then puts the asset back into service, the ML-based prognostic-surveillance techniques will still be subject to Following and will continue to miss alarms.

Hence, what is needed is a technique for effectively characterizing and mitigating the effects of signal Following in ML-based prognostic-surveillance systems.

SUMMARY

The disclosed embodiments relate to a system that characterizes susceptibility of an inferential model to follow signal degradation. During operation, the system receives a set of time-series signals associated with sensors in a monitored system during normal fault-free operation. Next, the system trains the inferential model using the set of time-series signals. The system then characterizes susceptibility of the inferential model to follow signal degradation. During this process, the system adds degradation to a signal in the set of time-series signals to produce a degraded signal. Next, the system uses the inferential model to perform prognostic-surveillance operations on the set of time-series signals with the degraded signal. Finally, the system characterizes susceptibility of the inferential model to follow degradation in the signal based on results of the prognostic-surveillance operations.

In some embodiments, the process of characterizing susceptibility is repeated for all signals in the set of time-series signals.

In some embodiments, the training and characterizing operations are repeated while adding different degradation amplitudes to the signal to determine how the different degradation amplitudes affect susceptibility of the inferential model to follow signal degradation.

In some embodiments, the training and characterizing operations are repeated while using different numbers of training vectors for the inferential model to determine how different numbers of training vectors affect susceptibility of the inferential model to follow signal degradation.

In some embodiments, the training and characterizing operations are repeated while adding different amounts of noise to the set of time-series signals to determine how different amounts of noise affect susceptibility of the inferential model to follow signal degradation.

In some embodiments, the training and characterizing operations are repeated while using different numbers of time-series signals from the set of time-series signals to determine how using different numbers of time-series signals affects susceptibility of the inferential model to follow signal degradation.

In some embodiments, the degradation that is added to the signal is a ramp-shaped degradation, which causes a corresponding slope in residuals generated using the inferential model. In these embodiments, characterizing the susceptibility of the inferential model to follow degradation involves computing a Following metric (FM), wherein FM=1−[Ratio (slope of residuals/slope of ramp)].

In some embodiments, the system additionally reports results of the characterization to a user or developer of the inferential model.

In some embodiments, when the characterizing operation indicates that the inferential model is susceptible to Following signal degradation, the system automatically suggests one or more of the following based on results of the characterization: changing a number of training vectors used to train the inferential model; performing filtering operations to remove noise from signals monitored by the inferential model; and changing a number of signals monitored by the inferential model.

In some embodiments, during a surveillance mode, the system: uses the inferential model to generate estimated values based on subsequently received time-series signals from the monitored system; performs a pairwise differencing operation between actual values and the estimated values for the subsequently received time-series signals to produce residuals; and analyzes the residuals to detect the incipient anomalies in the monitored system.

In some embodiments, detecting the incipient anomalies in the monitored system comprises detecting an impending failure of the monitored system, or a malicious-intrusion event in the monitored system.

In some embodiments, the received set of time-series signals comprises synthesized signals generated by a high-fidelity signal synthesizer, which generates simulations of actual signals produced by sensors in the monitored system during normal fault-free operation.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Exemplary Prognostic-Surveillance System

Figure 1:
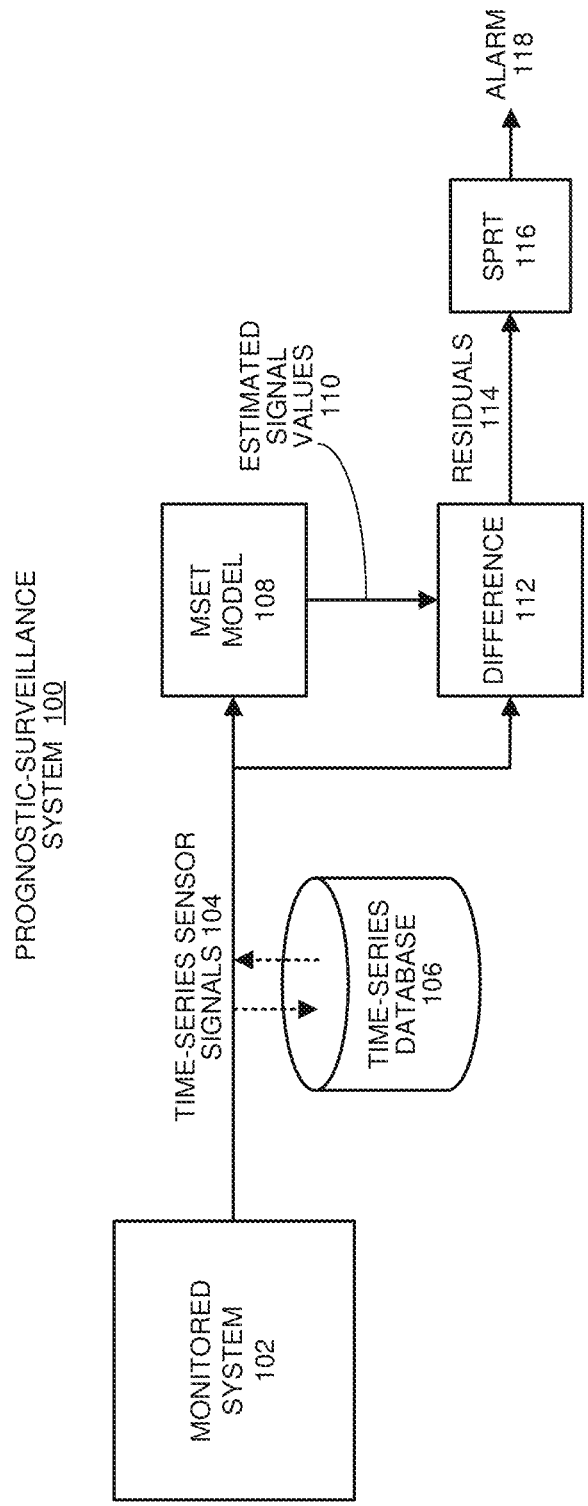
FIG. 1 illustrates an exemplary prognostic-surveillance system in accordance with the disclosed embodiments.

Before describing techniques for characterizing susceptibility of an inferential model to follow signal degradation further, we first describe an exemplary prognostic-surveillance system in which the techniques can be used. FIG. 1 illustrates a prognostic-surveillance system 100 that accesses a time-series database 106, containing time-series signals in accordance with the disclosed embodiments. As illustrated in FIG. 1, prognostic-surveillance system 100 operates on a set of time-series sensor signals 104 obtained from sensors in a monitored system 102. Note that monitored system 102 can generally include any type of machinery or facility, which includes sensors and generates time-series signals. Moreover, time-series signals 104 can originate from any type of sensor, which can be located in a component in monitored system 102, including: a voltage sensor; a current sensor; a pressure sensor; a rotational speed sensor; and a vibration sensor.

During operation of prognostic-surveillance system 100, time-series signals 104 can feed into a time-series database 106, which stores the time-series signals 104 for subsequent analysis. Next, the time-series signals 104 either feed directly from monitored system 102 or from time-series database 106 into a Multivariate State Estimation Technique (MSET) pattern-recognition model 108. Although it is advantageous to use an inferential model, such as MSET, for pattern-recognition purposes, the disclosed embodiments can generally use any one of a generic class of pattern-recognition techniques called nonlinear, nonparametric (NLNP) regression, which includes neural networks, support vector machines (SVMs), auto-associative kernel regression (AAKR), and even simple linear regression (LR).

Next, MSET model 108 is "trained" to learn patterns of correlation among all of the time-series signals 104. This training process involves a one-time, computationally intensive computation, which is performed offline with accumulated data that contains no anomalies. The pattern-recognition system is then placed into a "real-time surveillance mode," wherein the trained MSET model 108 predicts what each signal should be, based on other correlated variables; these are the "estimated signal values" 110 illustrated in FIG. 1. Next, the system uses a difference module 112 to perform a pairwise differencing operation between the actual signal values and the estimated signal values to produce residuals 114. The system then performs a "detection operation" on the residuals 114 by using SPRT module 116 to detect anomalies and possibly to generate an alarm 118. (For a description of the SPRT model, please see Wald, Abraham, June 1945, "Sequential Tests of Statistical Hypotheses." *Annals of Mathematical Statistics.* 16 (2): 117-186.) In this way, prognostic-surveillance system 100 can proactively alert system operators of incipient anomalies, such as impending failures, hopefully with enough lead time so that such problems can be avoided or proactively fixed.

Figure 2:
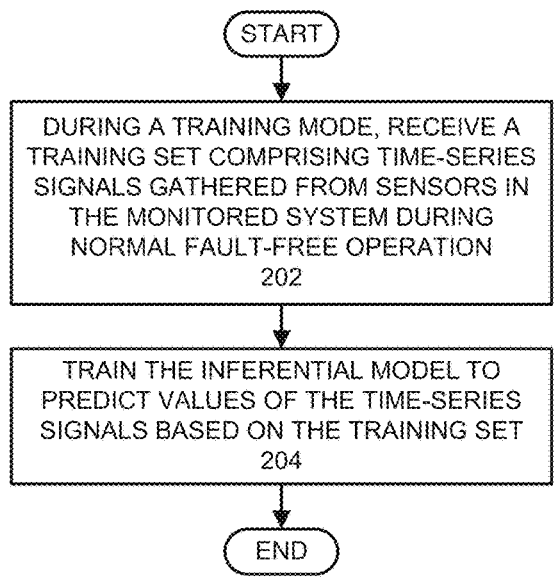
FIG. 2 presents a flow chart illustrating a process for training an inferential model in accordance with the disclosed embodiments.
Figure 3:
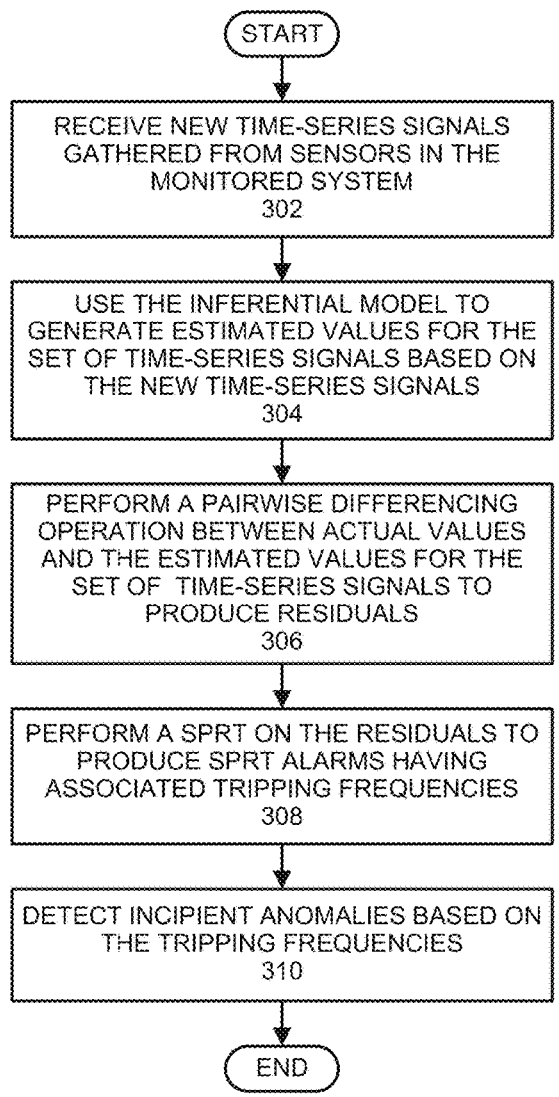
FIG. 3 presents a flow chart illustrating a process for using an inferential model to perform a prognostic-surveillance operation in accordance with the disclosed embodiments.

The prognostic surveillance system 100 illustrated in FIG. 1 operates generally as follows. During a training mode, which is illustrated in the flow chart in FIG. 2, the system receives a training set comprising time-series signals gathered from sensors in the monitored system under normal fault-free operation (step 202). The system then trains the inferential model to predict values of the time-series signals based on the training set (step 204). During a subsequent surveillance mode, which is illustrated by the flow chart in FIG. 3, the system receives new time-series signals gathered from sensors in the monitored system (step 302). Next, the system uses the inferential model to generate estimated values for the set of time-series signals based on the new time-series signals (step 304). The system then performs a pairwise differencing operation between actual values and the estimated values for the set of time-series signals to produce residuals (step 306). The system then analyzes the residuals to detect the incipient anomalies in the monitored system. This involves performing a SPRT on the residuals to produce SPRT alarms with associated tripping frequencies (step 308), and then detecting incipient anomalies based on the tripping frequencies (step 310). Note that these incipient anomalies can be associated with an impending failure of the monitored system, or a malicious-intrusion event in the monitored system.

Following Metric

We have developed a new "Following metric" (FM) to facilitate characterizing the susceptibility of an ML model to follow signal degradation. When an ML model is susceptible to Following, the model estimates follow the degradation, so the residuals stabilize and/or remain close to zero, which means that anomaly are not discovered and subsequently alerts are not generated. Conversely, when an ML model is not susceptible to Following, when a signal drifts out of correlation with other monitored signals, the residuals depart from zero, which triggers anomaly alerts. The above observations have guided us in developing a quantitative metric for characterizing the degree of Following for any ML model that operates on any dataset of monitored signals.

Our Following metric (FM) ranges from zero to one, with higher values indicating that an ML model is susceptible to Following, and lower values indicating there is little susceptibility to Following. This metric is measured by introducing a ramp-shaped degradation into a signal and then measuring a resulting change in the slope of the residuals.

More specifically, the Following metric FM is defined as follows.

$$FM=1-[\text{ratio}(\text{slope of residuals/slope of ramp})]$$

Hence, if a ramp-shaped degradation in a signal does not cause a corresponding slope in the residuals, this means that the ML model is "Following" the degradation. This means the ratio (slope of residuals/slope of ramp) is zero and the FM=1. Conversely, if the ramp-shaped degradation causes a similar slope in the residuals, this means that the inferential model is "not Following" the degradation, so the ratio (slope of residuals/slope of ramp)$\approx$1 and the FM$\approx$0.

Exemplary Use Case

We now present results for an exemplary use case, which can possibly arise in utility system asset prognostics as well as in prognostics for servers in computer data centers. In this example, each signal has 10,000 time-series observations without any degradation. We use an analytical fault simulator to introduce a ramp-shaped degradation in Signal 5 starting from observation number 7,501 as illustrated in FIGS. 4A, 4B, 5A and 5B. Note that this ramp-shaped degradation simulates a common degradation mode for physical sensors, which is referred to as "linear de-calibration bias." In this example, the collection of signals is fit to an MSET model and the residuals (differences between actual signal values and MSET estimates) are passed through a SPRT to detect degradation and generate corresponding SPRT alarms.

Figure 4A:
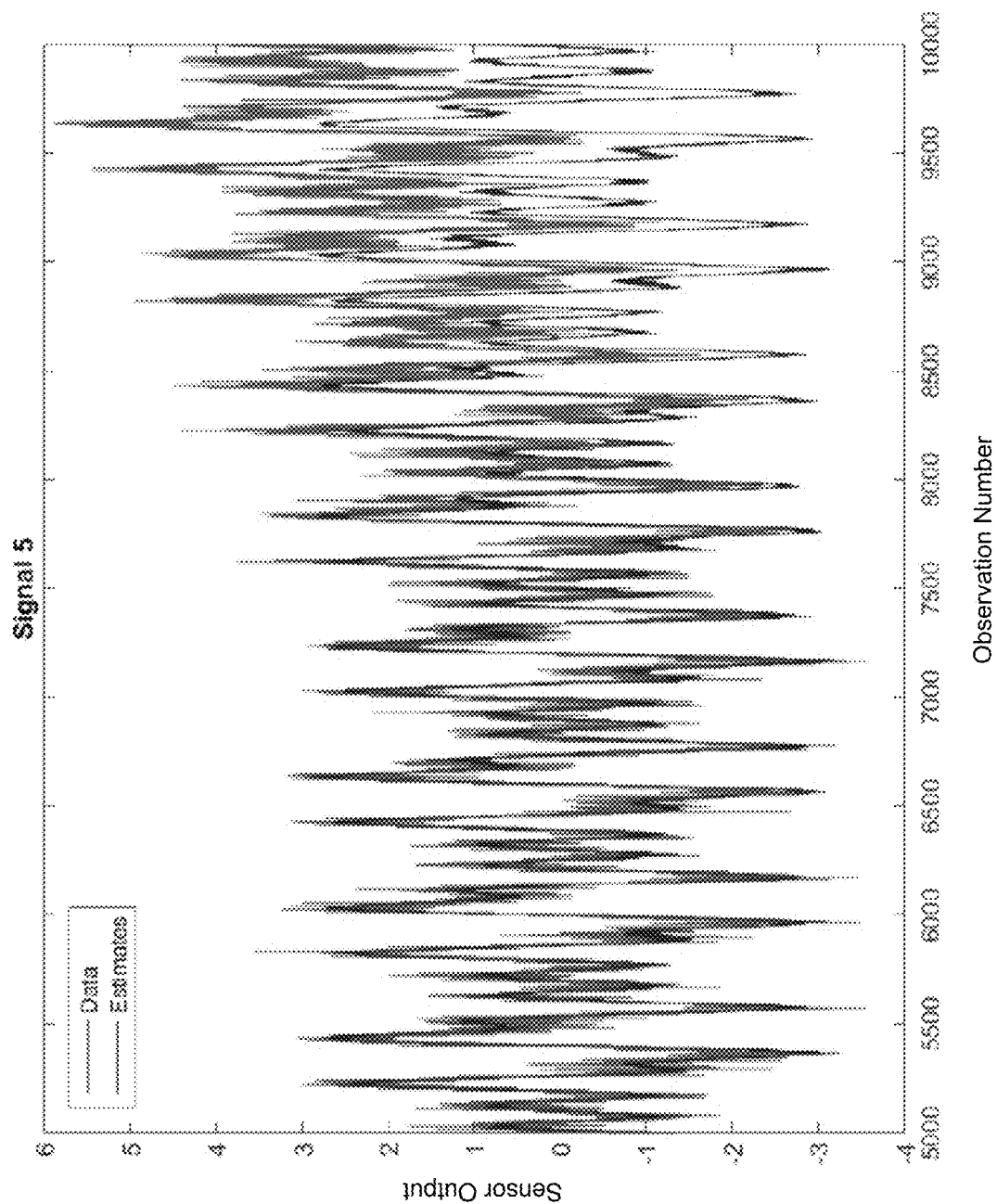
FIG. 4A presents a graph illustrating MSET estimates and original data during signal degradation for a model with no Following in accordance with the disclosed embodiments.
Figure 4B:
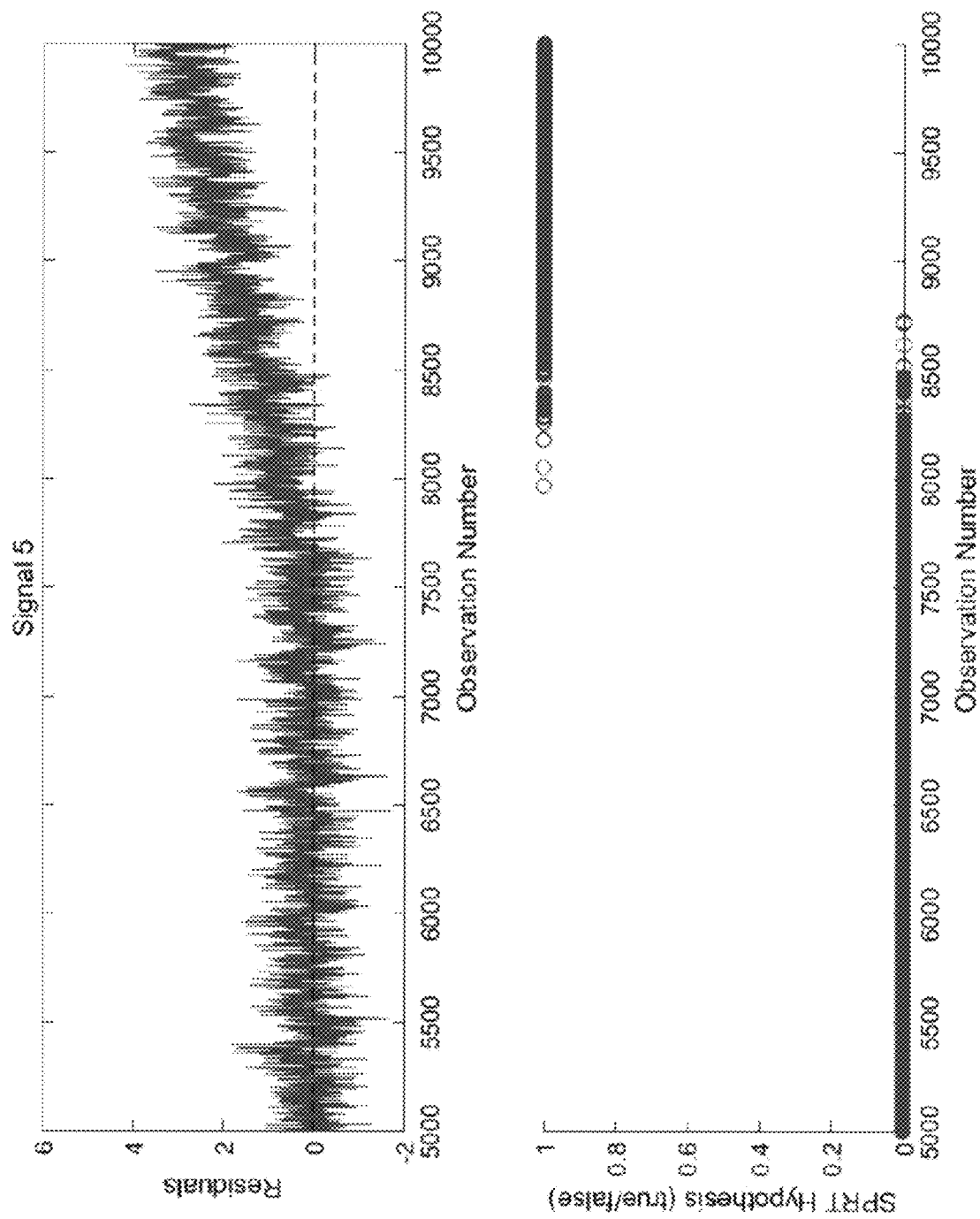
FIG. 4B presents a graph illustrating residuals and associated SPRT alarms during signal degradation for a model with no Following in accordance with the disclosed embodiments.

When the MSET model is not subject to signal Following, the corresponding residuals will cause SPRT alarms to be generated as is illustrated in FIGS. 4A-4B. More specifically, FIG. 4A presents a graph illustrating an original data signal (in red), which is overlaid on a corresponding MSET estimate signal (in blue). Note that the original data signal ramps up, but the estimated signal does not because the estimated signal reflects what the original data is supposed to be (if there were no degradation). The top graph in FIG. 4B illustrates how the resulting residual signal ramps up from observation 7,501 to observation 10,000. This ramp causes a corresponding increase in SPRT alarms as is illustrated in the bottom graph in FIG. 4B.

Figure 5A:
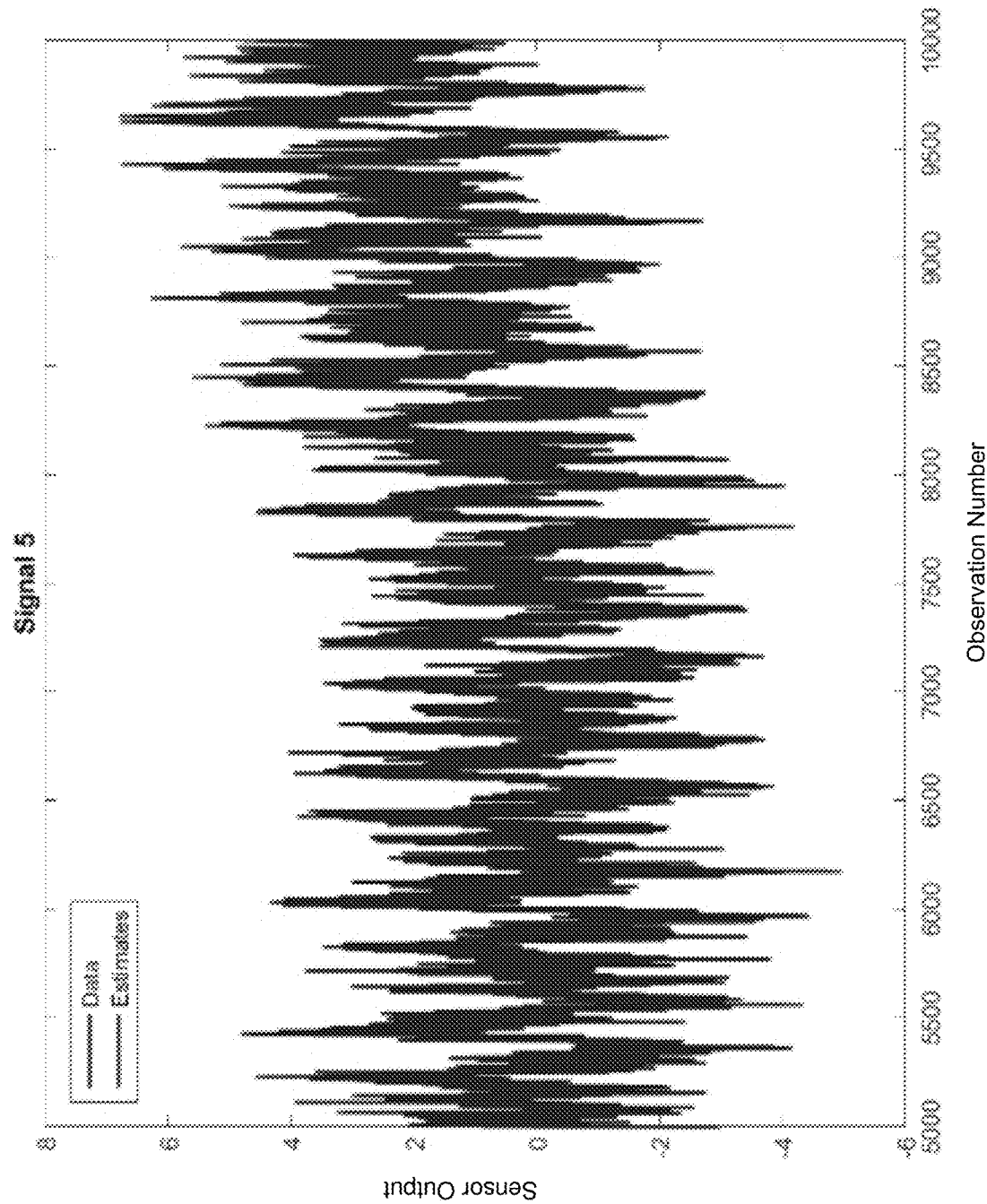
FIG. 5A presents a graph illustrating MSET estimates and original data during signal degradation for a model with Following in accordance with the disclosed embodiments.
Figure 5B:
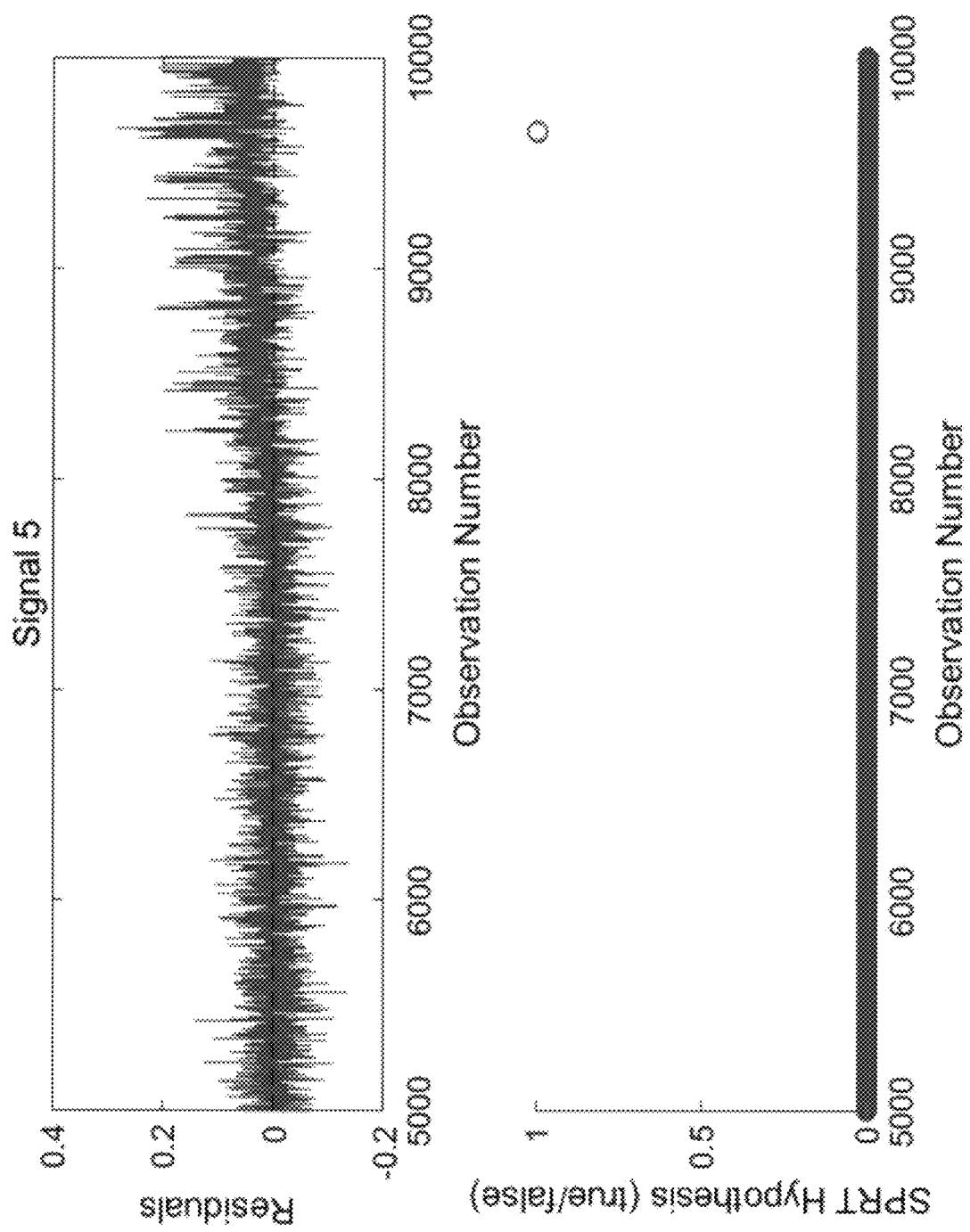
FIG. 5B presents a graph illustrating residuals and associated SPRT alarms during signal degradation for a model with Following in accordance with the disclosed embodiments.

In contrast, when the MSET model is subject to signal Following, the corresponding residuals will not cause SPRT alarms as is illustrated in FIGS. 5A-5B. More specifically, FIG. 5A presents a graph illustrating an original data signal (in red), which is overlaid on a corresponding MSET estimate signal (in blue). Note that the original data signal ramps up, which is caused by the simulated degradations, yet the estimate signal "follows" the original data signal and also ramps up, so the two signals essentially match. The top graph in FIG. 5B illustrates how the resulting residual signal only ramps up slightly from observation 7,501 up to observation 10,000. This slight ramp in residuals is statistically insufficient to cause SPRT alarms to be generated as is illustrated in the bottom graph in FIG. 5B.

Characterizing Following

To better understand the Following phenomena and the effect of various parameters on it, we conducted an investigation that performed a parametric sweep across a number of parameters for an exemplary system to determine how the parameters influence the degree of Following. These parameters include: (1) number of signals used by the MSET model (NumSigs), (2) signal noise measures with respect to a standard deviation (STD), (3) number of training vectors for the MSET model (NumVecs), and (4) amplitude of the ramp-shaped degradation (DegRamp).

Figure 6A:
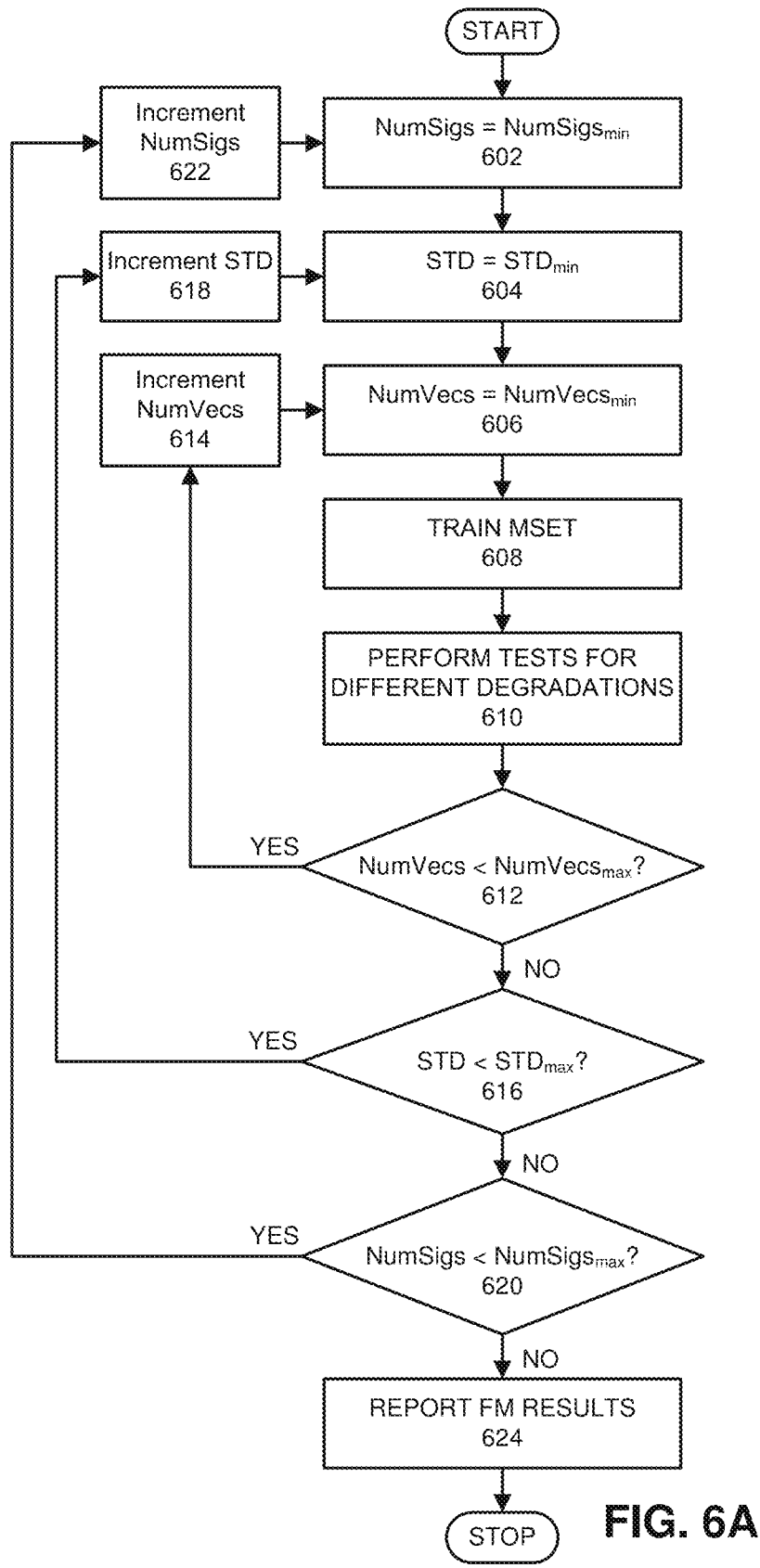
FIG. 6A presents a flow chart illustrating a process for characterizing Following and the effect of various parameters on it in accordance with the disclosed embodiments.
Figure 6B:
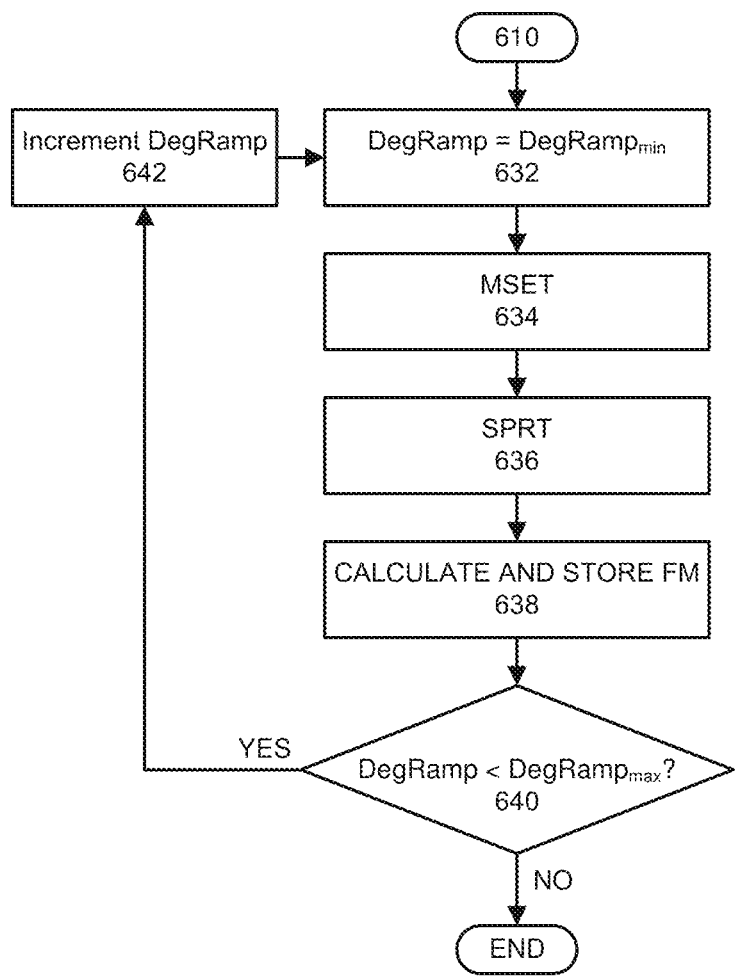
FIG. 6B presents a flow chart illustrating a process for performing tests to characterize Following for different degradation amplitudes in accordance with the disclosed embodiments.

A flow chart for this parametric sweep appears in FIGS. 6A-6B. The flow chart in FIG. 6A includes three nested loops involving steps 602 through 620 that cycle through all possible values for NumSigs, STD and NumVecs. At the core of these nested loops, an MSET model is trained (step 608) and tests are performed to determine a degree of Following for different degradation amplitudes (step 610). Finally, the system reports FM metrics (step 624).

The flow chart in FIG. 6B illustrates operations that take place in step 610 of the flow chart in FIG. 6A. In FIG. 6B, a loop, which is implemented by steps 632, 640 and 642, cycles through all possible amplitudes of ramp degradation. Within this loop, the system executes the MSET model (step 634) to generate estimates and corresponding residuals that feed into a SPRT module (step 636). The system also calculates and stores an FM (step 638).

The above-described comprehensive parametric analysis ensures for any set of monitored signals (per a customer's use case) that the system determines whether the inferential model is absolutely robust (with no possibility of Following). Otherwise, if Following is detected, an alert is sent to a data scientist indicating that the model is susceptible to Following. At this point, a mitigation analysis can be performed to determine optimal values of the parameters to minimize Following. (Note that, in some use cases, optimal parameters can mitigate or eliminate the Following phenomenon. However, in other use cases, the Following phenomenon cannot be eliminated by adjusting the parameters.)

Figure 7A:
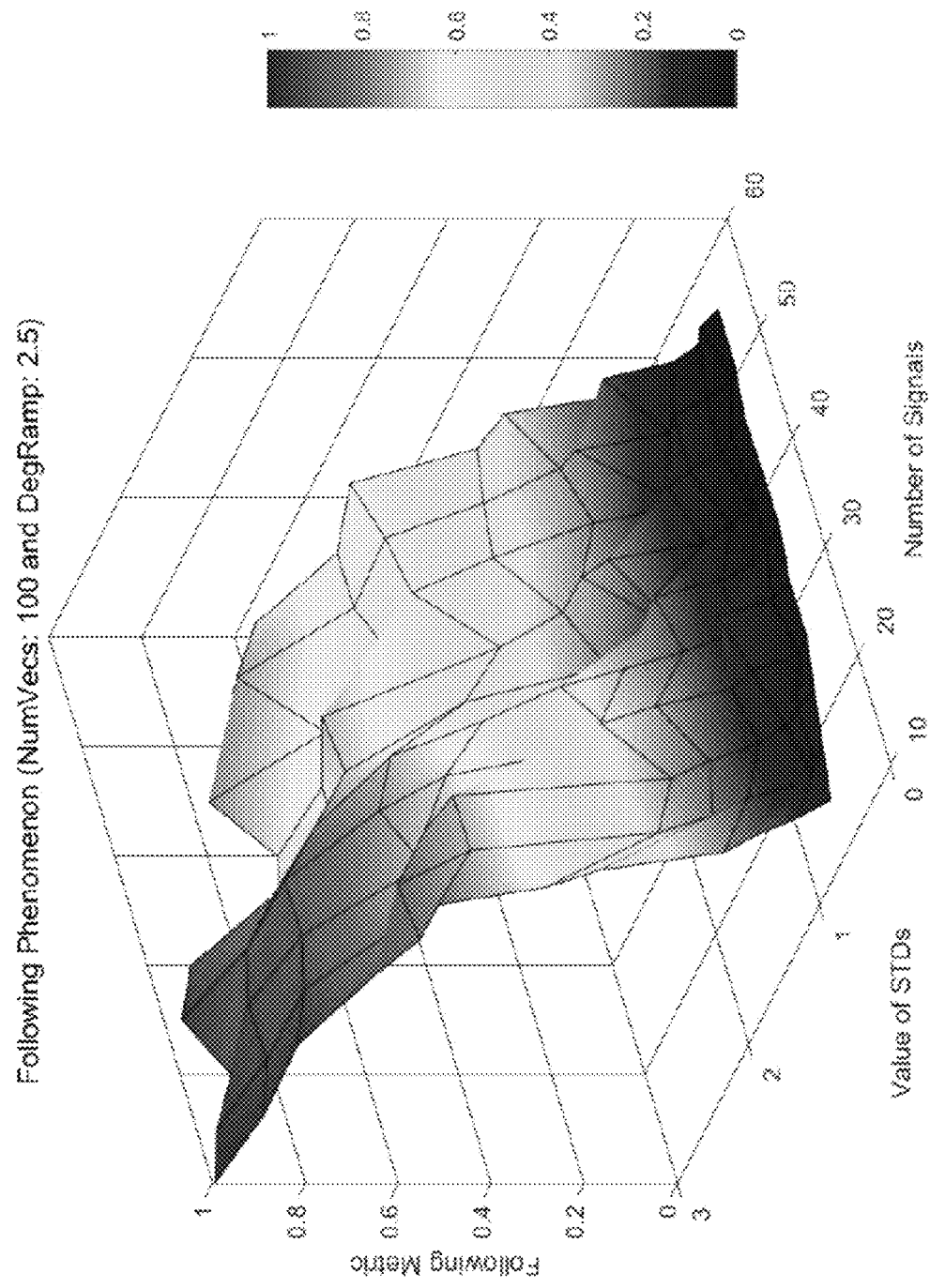
FIG. 7A presents a graph illustrating the effect of signal noise and number of signals on Following in accordance with the disclosed embodiments.
Figure 7B:
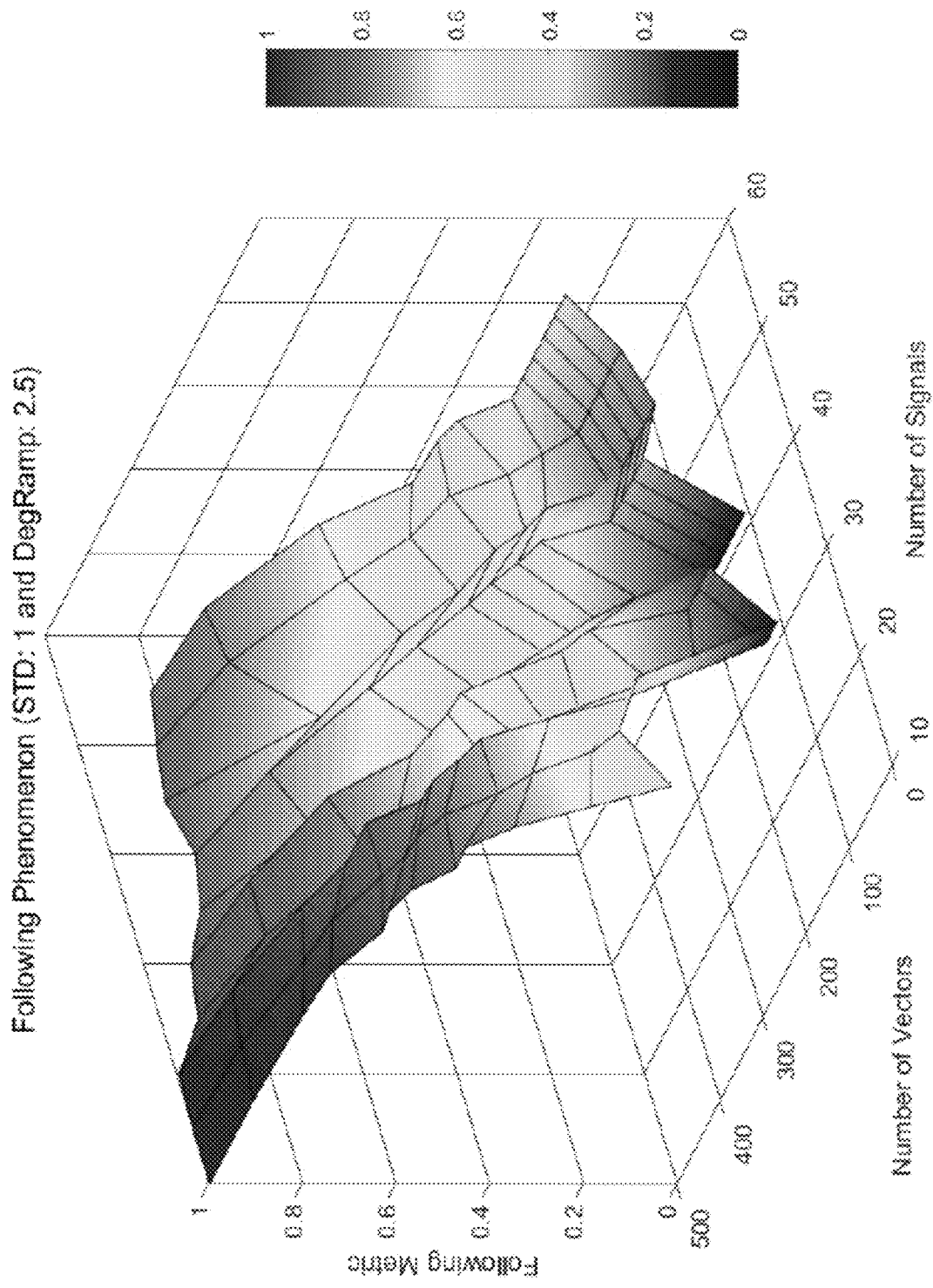
FIG. 7B presents a graph illustrating the effect of number of model vectors and number of signals on Following in accordance with the disclosed embodiments.
Figure 7C:
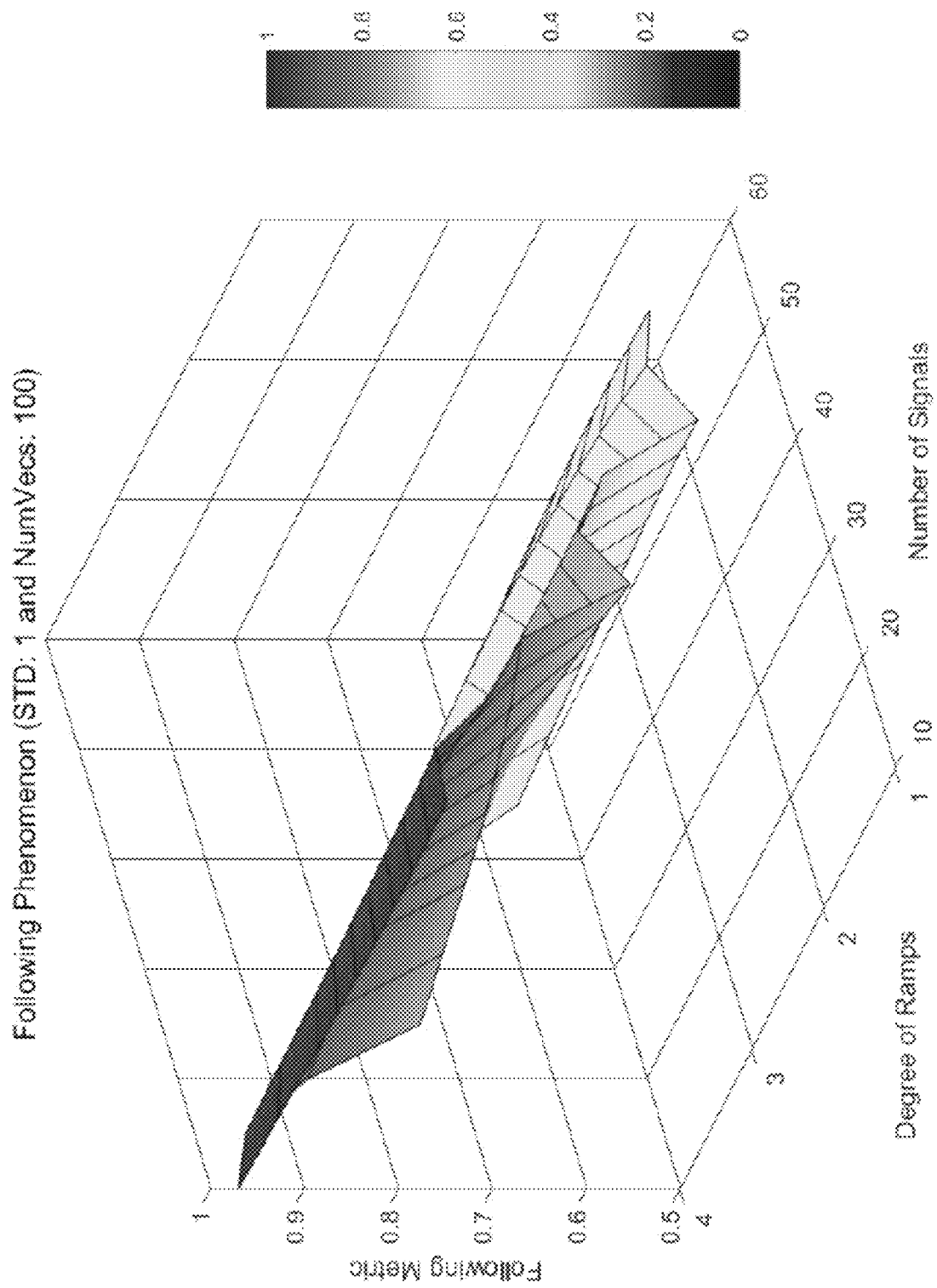
FIG. 7C presents a graph illustrating the effect of degradation amplitude and number of signals on Following in accordance with the disclosed embodiments.
Figure 7D:
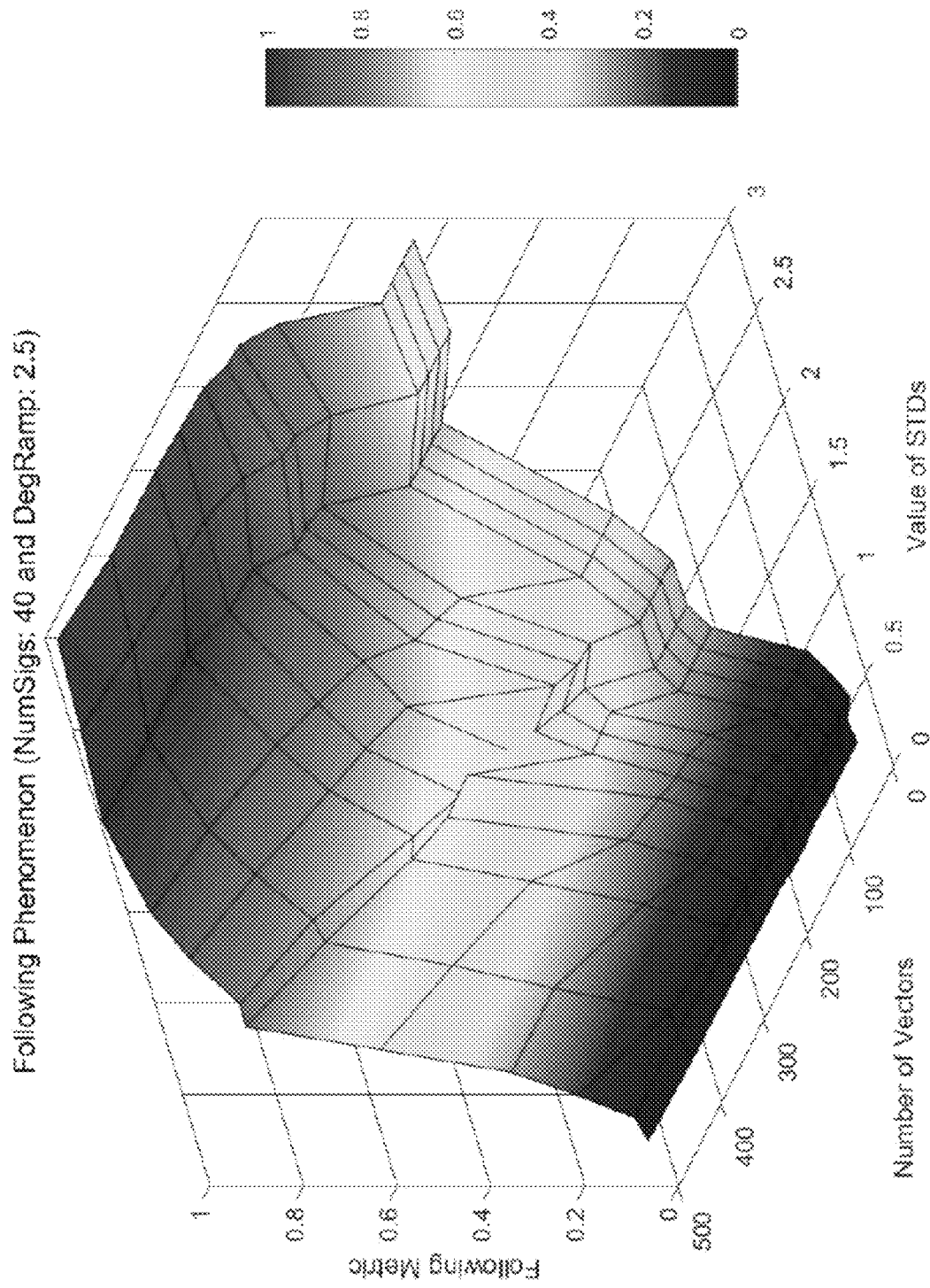
FIG. 7D presents a graph illustrating the effect of number of model vectors and signal noise on Following in accordance with the disclosed embodiments.
Figure 7E:
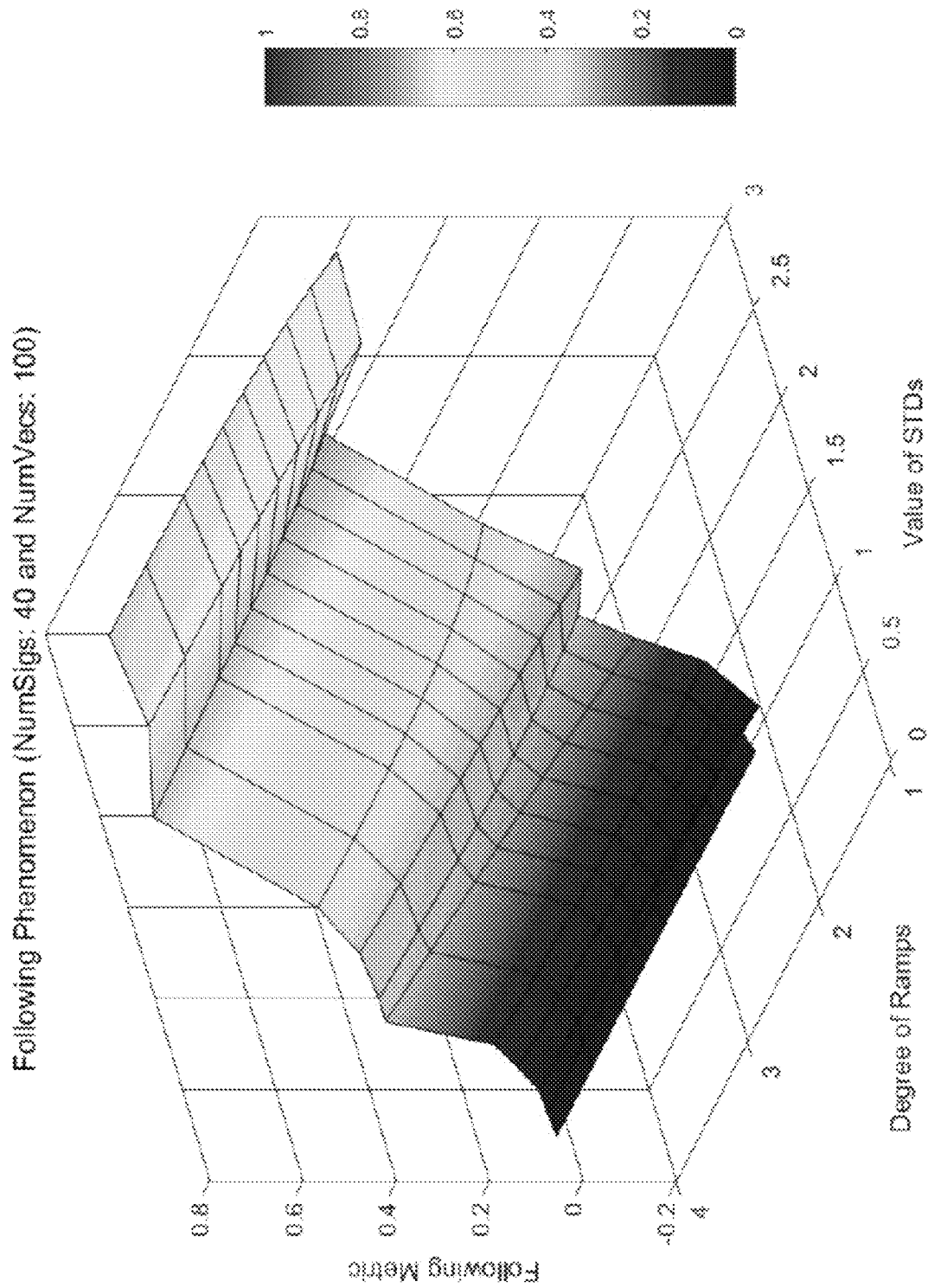
FIG. 7E presents a graph illustrating the effect of degradation amplitude and signal noise on Following in accordance with the disclosed embodiments.
Figure 7F:
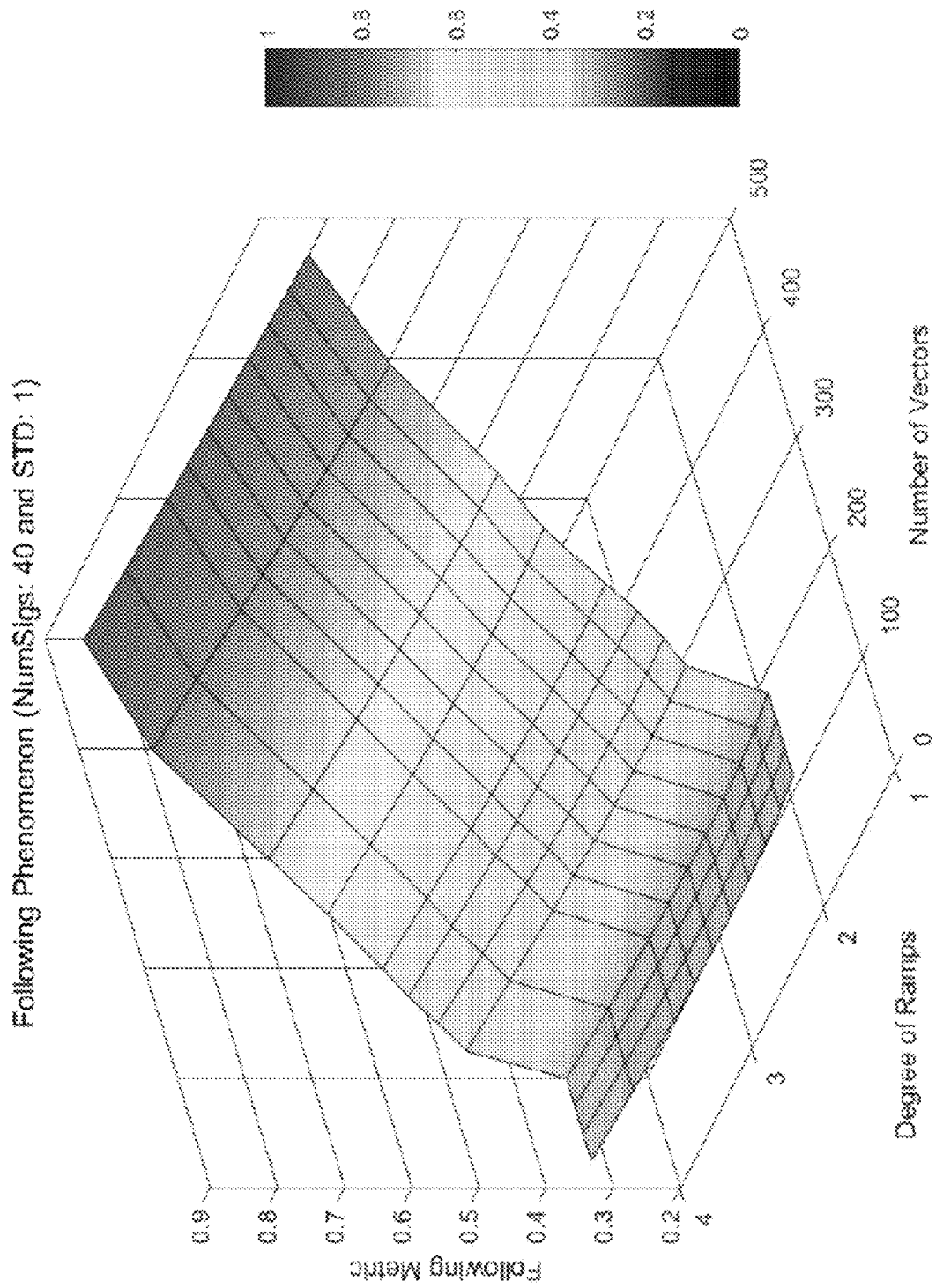
FIG. 7F presents a graph illustrating the effect of degradation amplitude and number of model vectors on Following in accordance with the disclosed embodiments.

The mitigation analysis can be facilitated by generating graphs, which illustrate how the Following metric varies for various combinations of parameters. In particular, FIG. 7A illustrates the effect of signal noise and number of signals on Following while NumVecs is fixed at 100 and DegRamp is fixed at 2.5. FIG. 7B presents a graph illustrating the effect of number of model vectors and number of signals on Following while STD is fixed at 1 and DegRamp is fixed at 2.5. FIG. 7C illustrates the effect of degradation amplitude and number of signals on Following while STD is fixed at 1 and NumVecs is fixed at 100. FIG. 7D illustrates the effect of number of model vectors and signal noise on Following while NumSigs is fixed at 40 and DegRamp is fixed at 2.5. FIG. 7E illustrates the effect of degradation amplitude and signal noise on Following while NumSigs is fixed at 40 and NumVecs is fixed at 100. FIG. 7F illustrates the effect of degradation amplitude and number of model vectors on Following while NumSigs is fixed at 40 and STD is fixed at 1. Note that the graphs illustrated in FIGS. 7A-7F provide sufficient information to determine the optimal combination of parameters to minimize Following.

High-Level Process for Characterizing Following

Figure 8:
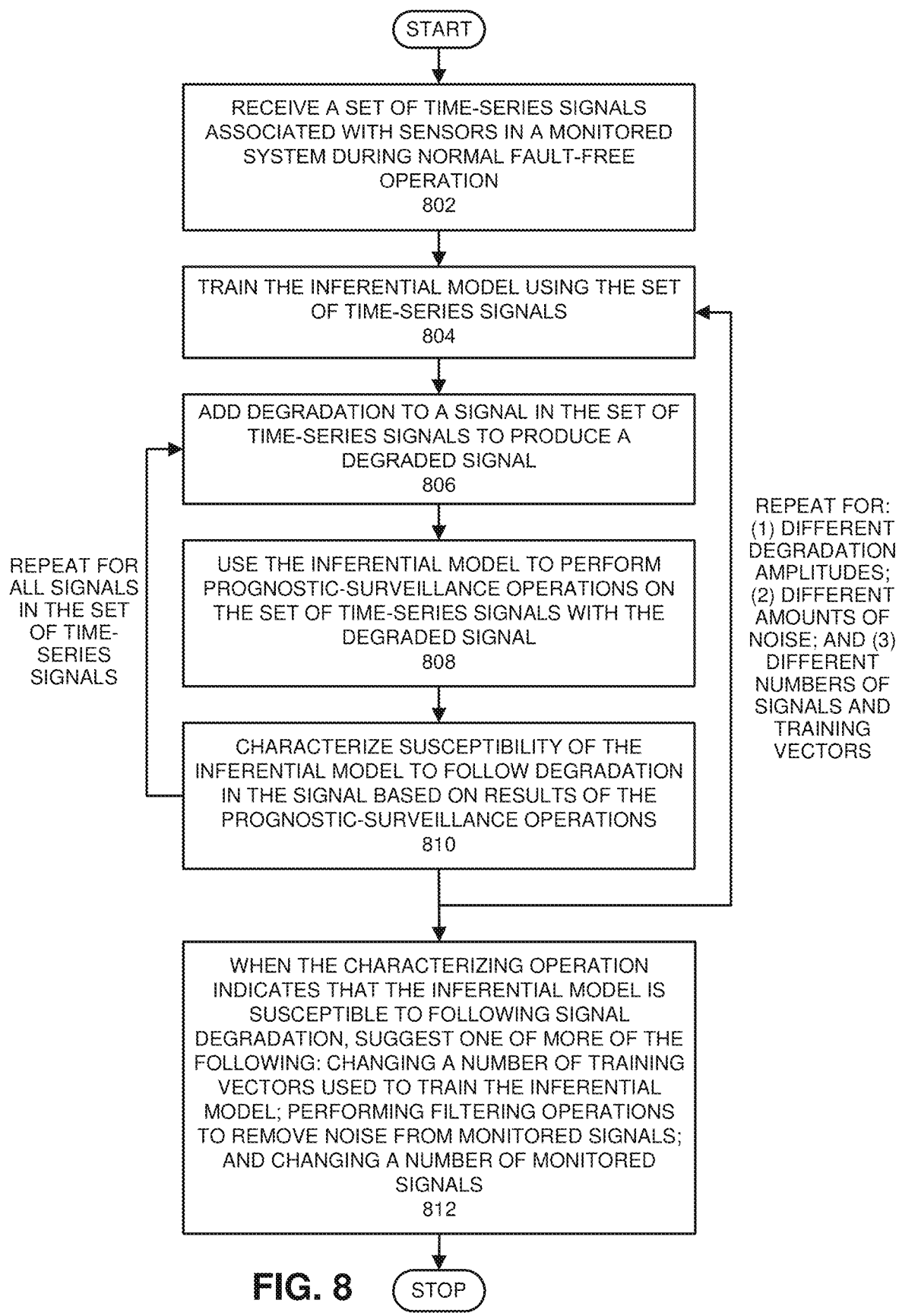
FIG. 8 presents a high-level flow chart illustrating a process for characterizing susceptibility of an inferential model to follow signal degradation in accordance with the disclosed embodiments.

FIG. 8 presents a high-level flow chart illustrating a process for characterizing susceptibility of an inferential model to follow signal degradation Following in accordance with the disclosed embodiments. During operation, the system receives a set of time-series signals associated with sensors in a monitored system during normal fault-free operation (step 802). Next, the system trains the inferential model using the set of time-series signals (step 804). The system then characterizes susceptibility of the inferential model to follow signal degradation. During this process, the system adds degradation to a signal in the set of time-series signals to produce a degraded signal (step 806). Next, the system uses the inferential model to perform prognostic-surveillance operations on the set of time-series signals with the degraded signal (step 808). The system then characterizes susceptibility of the inferential model to follow degradation in the signal based on results of the prognostic-surveillance operations (step 810). Note that the process for characterizing susceptibility performed in steps 806, 808 and 810 is repeated for all signals in the set of time-series signals. Also, note that the training and characterizing operations performed in steps 804 806, 808 and 810 is repeated for: different degradation amplitudes; different amounts of noise; and different numbers of signals and training vectors Finally, when the characterizing operation indicates that the inferential model is susceptible to Following signal degradation, the system suggests one or more of the following: changing a number of training vectors used to train the inferential model; performing filtering operations to remove noise from signals monitored by the inferential model; and changing a number of signals monitored by the inferential model (step 812).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for characterizing susceptibility of an inferential model to follow signal degradation, comprising:
receiving a set of time-series signals associated with sensors in a monitored system during normal fault-free operation;
training the inferential model using the set of time-series signals; and
characterizing susceptibility of the inferential model to follow signal degradation by, adding degradation to a signal in the set of time-series signals to produce a degraded signal, using the inferential model to perform prognostic-surveillance operations on the set of time-series signals with the degraded signal, and characterizing the susceptibility of the inferential model to follow degradation in the signal based on results of the prognostic-surveillance operations.

2. The method of claim 1, wherein the process of characterizing susceptibility is repeated for all signals in the set of time-series signals.

3. The method of claim 1, wherein the training and characterizing operations are repeated while adding different degradation amplitudes to the signal to determine how the different degradation amplitudes affect susceptibility of the inferential model to follow signal degradation.

4. The method of claim 1, wherein the training and characterizing operations are repeated while using different numbers of training vectors for the inferential model to determine how different numbers of training vectors affect susceptibility of the inferential model to follow signal degradation.

5. The method of claim 1, wherein the training and characterizing operations are repeated while adding different amounts of noise to the set of time-series signals to determine how different amounts of noise affect susceptibility of the inferential model to follow signal degradation.

6. The method of claim 1, wherein the training and characterizing operations are repeated while using different numbers of time-series signals from the set of time-series signals to determine how using different numbers of time-series signals affects susceptibility of the inferential model to follow signal degradation.

7. The method of claim 1, wherein the degradation that is added to the signal is a ramp-shaped degradation, which causes a corresponding slope in residuals generated using the inferential model; and wherein characterizing the susceptibility of the inferential model to follow degradation involves computing a Following metric (FM), wherein $$FM=1-[Ratio(slope\ of\ residuals/slope\ of\ ramp)].$$

8. The method of claim 1, further comprising reporting results of the characterization to a user or developer of the inferential model.

9. The method of claim 1, wherein when the characterizing operation indicates that the inferential model is susceptible to Following signal degradation, the method further comprises automatically suggesting one or more of the following based on results of the characterization:

changing a number of training vectors used to train the inferential model;

performing filtering operations to remove noise from signals monitored by the inferential model; and changing a number of signals monitored by the inferential model.

10. The method of claim 1, wherein during a surveillance mode, the method further comprises:

using the inferential model to generate estimated values based on subsequently received time-series signals from the monitored system;

performing a pairwise differencing operation between actual values and the estimated values for the subsequently received time-series signals to produce residuals; and analyzing the residuals to detect the incipient anomalies in the monitored system.

11. The method of claim 10, wherein detecting the incipient anomalies in the monitored system comprises detecting one or more of the following:

an impending failure of the monitored system; and a malicious-intrusion event in the monitored system.

12. The method of claim 1, wherein the received set of time-series signals comprises synthesized signals generated by a high-fidelity signal synthesizer, which generates simulations of actual signals produced by sensors in the monitored system during normal fault-free operation.

13. A non-transitory computer-readable storage medium storing instructions that when executed by a computer cause the computer to perform a method for characterizing susceptibility of an inferential model to follow signal degradation, the method comprising:

receiving a set of time-series signals associated with sensors in a monitored system during normal fault-free operation;

training the inferential model using the set of time-series signals; and characterizing susceptibility of the inferential model to follow signal degradation by, adding degradation to a signal in the set of time-series signals to produce a degraded signal, using the inferential model to perform prognostic-surveillance operations on the set of time-series signals with the degraded signal, and characterizing the susceptibility of the inferential model to follow degradation in the signal based on results of the prognostic-surveillance operations.

14. The non-transitory computer-readable storage medium of claim 13, wherein the process of characterizing susceptibility is repeated for all signals in the set of time-series signals.

15. The non-transitory computer-readable storage medium of claim 13, wherein the training and characterizing operations are repeated while adding different degradation amplitudes to the signal to determine how the different degradation amplitudes affect susceptibility of the inferential model to follow signal degradation.

16. The non-transitory computer-readable storage medium of claim 13, wherein the training and characterizing operations are repeated while:

using different numbers of training vectors for the inferential model to determine how different numbers of training vectors affect susceptibility of the inferential model to follow signal degradation;

adding different amounts of noise to the set of time-series signals to determine how different amounts of noise affect susceptibility of the inferential model to follow signal degradation; and using different numbers of time-series signals from the set of time-series signals to determine how using different numbers of time-series signals affects susceptibility of the inferential model to follow signal degradation.

17. The method of claim 13, wherein the degradation that is added to the signal is a ramp-shaped degradation, which causes a corresponding slope in residuals generated using the inferential model; and wherein characterizing the susceptibility of the inferential model to follow degradation involves computing a Following metric (FM), wherein $$FM=1-[Ratio(slope\ of\ residuals/slope\ of\ ramp)].$$

18. The non-transitory computer-readable storage medium of claim 13, wherein when the characterizing operation indicates that the inferential model is susceptible to Following signal degradation, the method further comprises automatically suggesting one or more of the following based on results of the characterization:
- changing a number of training vectors used to train the inferential model;
- performing filtering operations to remove noise from signals monitored by the inferential model; and
- changing a number of signals monitored by the inferential model.

19. The non-transitory computer-readable storage medium of claim 13, wherein during a surveillance mode, the method further comprises:
- using the inferential model to generate estimated values based on subsequently received time-series signals from the monitored system;
- performing a pairwise differencing operation between actual values and the estimated values for the subsequently received time-series signals to produce residuals; and
- analyzing the residuals to detect the incipient anomalies in the monitored system.

20. A system that characterizes susceptibility of an inferential model to follow signal degradation, comprising:
- at least one processor and at least one associated memory; and
- a prognostic-surveillance mechanism that executes on the at least one processor, wherein during operation, the prognostic-surveillance mechanism:
- receives a set of time-series signals associated with sensors in a monitored system during normal fault-free operation;
- trains the inferential model using the set of time-series signals; and
- characterizes susceptibility of the inferential model to follow signal degradation, wherein during the characterization, the prognostic-surveillance mechanism,
  - adds degradation to a signal in the set of time-series signals to produce a degraded signal,
  - uses the inferential model to perform prognostic-surveillance operations on the set of time-series signals with the degraded signal, and
  - characterizes susceptibility of the inferential model to follow degradation in the signal based on results of the prognostic-surveillance operations.

* * * * *

UNITED STATES PATENT AND TRADEMARK OFFICE
CERTIFICATE OF CORRECTION

| | | |
|---|---|---|
| PATENT NO. | : 11,921,848 B2 | Page 1 of 1 |
| APPLICATION NO. | : 17/086855 | |
| DATED | : March 5, 2024 | |
| INVENTOR(S) | : Chen et al. | |

It is certified that error appears in the above-identified patent and that said Letters Patent is hereby corrected as shown below:

In the Claims

In Column 10, Line 58, in Claim 17, delete "method" and insert -- non-transitory computer-readable storage medium --, therefor.

Signed and Sealed this
Twenty-third Day of July, 2024

Katherine Kelly Vidal
*Director of the United States Patent and Trademark Office*